US012645960B2

(12) United States Patent
Yamasaki et al.

(10) Patent No.: US 12,645,960 B2
(45) Date of Patent: Jun. 2, 2026

(54) LEARNING APPARATUS, METHOD AND INFERENCE APPARATUS

(71) Applicant: KABUSHIKI KAISHA TOSHIBA, Tokyo (JP)

(72) Inventors: Tomohiro Yamasaki, Tokyo (JP); Yoshiyuki Kokojima, Yokohama (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 870 days.

(21) Appl. No.: 17/823,772

(22) Filed: Aug. 31, 2022

(65) Prior Publication Data

US 2023/0281485 A1     Sep. 7, 2023

(30) Foreign Application Priority Data

Mar. 2, 2022     (JP) ................................. 2022-031923

(51) Int. Cl.
| | |
|---|---|
| *G06N 5/04* | (2023.01) |
| *G06N 3/044* | (2023.01) |
| *G06N 3/0464* | (2023.01) |
| *G06N 3/08* | (2023.01) |
| *G06V 10/82* | (2022.01) |
| *G06V 30/10* | (2022.01) |

(Continued)

(52) U.S. Cl.
CPC ............. *G06N 5/04* (2013.01); *G06V 30/158* (2022.01); *G06V 30/413* (2022.01); *G06N 3/044* (2023.01); *G06N 3/0464* (2023.01); *G06N 3/08* (2013.01); *G06V 10/82* (2022.01); *G06V 30/10* (2022.01); *G06V 30/19173* (2022.01)

(58) Field of Classification Search
CPC   G06N 5/04; G06N 3/044; G06N 3/08; G06N 3/0464; G06V 30/158; G06V 30/413; G06V 10/82; G06V 30/10; G06V 30/19173
See application file for complete search history.

(56) References Cited

U.S. PATENT DOCUMENTS

| | | | | |
|---|---|---|---|---|
| 5,594,809 A | * | 1/1997 | Kopec ................... | G06F 18/295 |
| | | | | 382/161 |
| 5,983,247 A | * | 11/1999 | Yamanaka ............... | G09G 5/00 |
| | | | | 715/255 |

(Continued)

FOREIGN PATENT DOCUMENTS

| | | |
|---|---|---|
| JP | 2013-239187 A | 11/2013 |
| JP | 6838209 B1 | 3/2021 |

OTHER PUBLICATIONS

Japan Patent Office, Office Action in JP App. No. 2022-031923, 3 pages, with machine translation, 5 pages (Feb. 4, 2025).

(Continued)

*Primary Examiner* — Quoc A Tran
(74) *Attorney, Agent, or Firm* — Finnegan, Henderson, Farabow, Garrett & Dunner, LLP

(57) ABSTRACT

According to one embodiment, a learning apparatus includes a processor. The processor acquires a document to which a tag is added. The processor converts the document into an image to generate a document image, and converts the tag into an image according to composition of the document image to generate a tag image. The processor trains a network model using the document image as input data and the tag image as ground truth data to generate a trained model.

16 Claims, 10 Drawing Sheets

(51) Int. Cl.
  G06V 30/148 (2022.01)
  G06V 30/19 (2022.01)
  G06V 30/413 (2022.01)

(56) References Cited

U.S. PATENT DOCUMENTS

| | | | |
|---|---|---|---|
| 2020/0280649 A1* | 9/2020 | Sakata | G06V 30/416 |
| 2021/0056336 A1* | 2/2021 | Ikeda | G06N 3/084 |
| 2021/0295103 A1* | 9/2021 | Tanniru | G06V 10/82 |
| 2021/0383106 A1 | 12/2021 | Maggio et al. | |

OTHER PUBLICATIONS

Christoph Wick et al., "Fully Convolutional Neural Networks for Page Segmentation of Historical Document Images," 13th IAPR Int'l Workshop on Document Analysis Systems (DAS), pp. 287-291 (2018).
Pierre Heroux et al., "Automatic Ground, truth Generation for Document Image Analysis and Understanding," Ninth Int'l Conf. on Document Analysis and Recognition (ICDAR) https://ieeexplore. ieee.org/document/4378755 (2007).

* cited by examiner

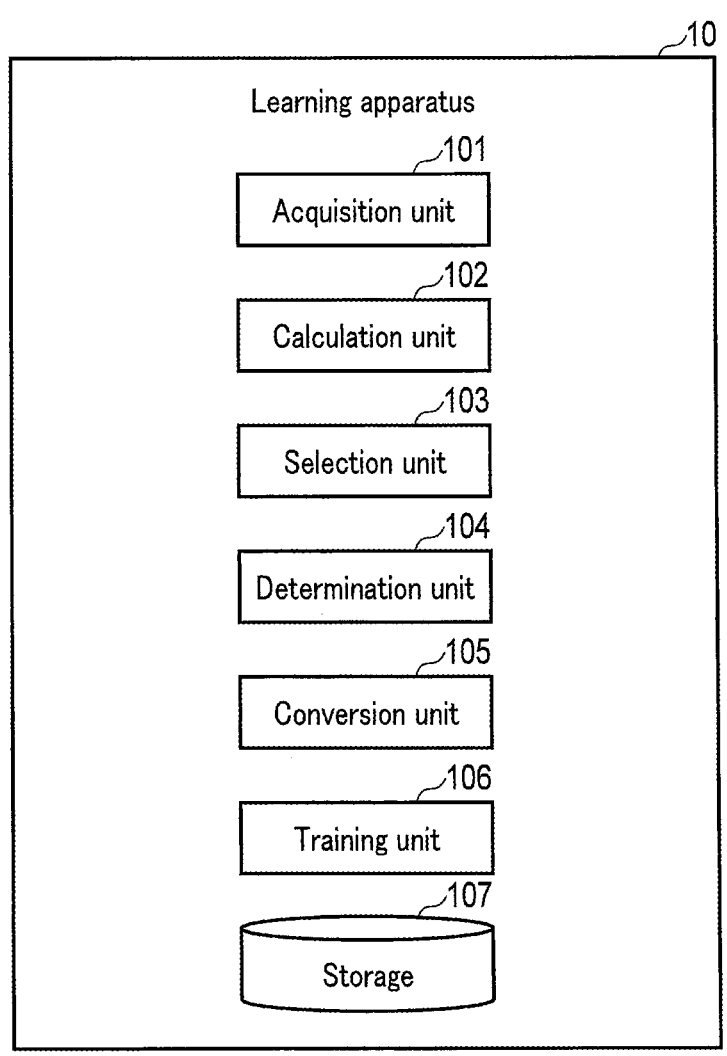
F I G. 1

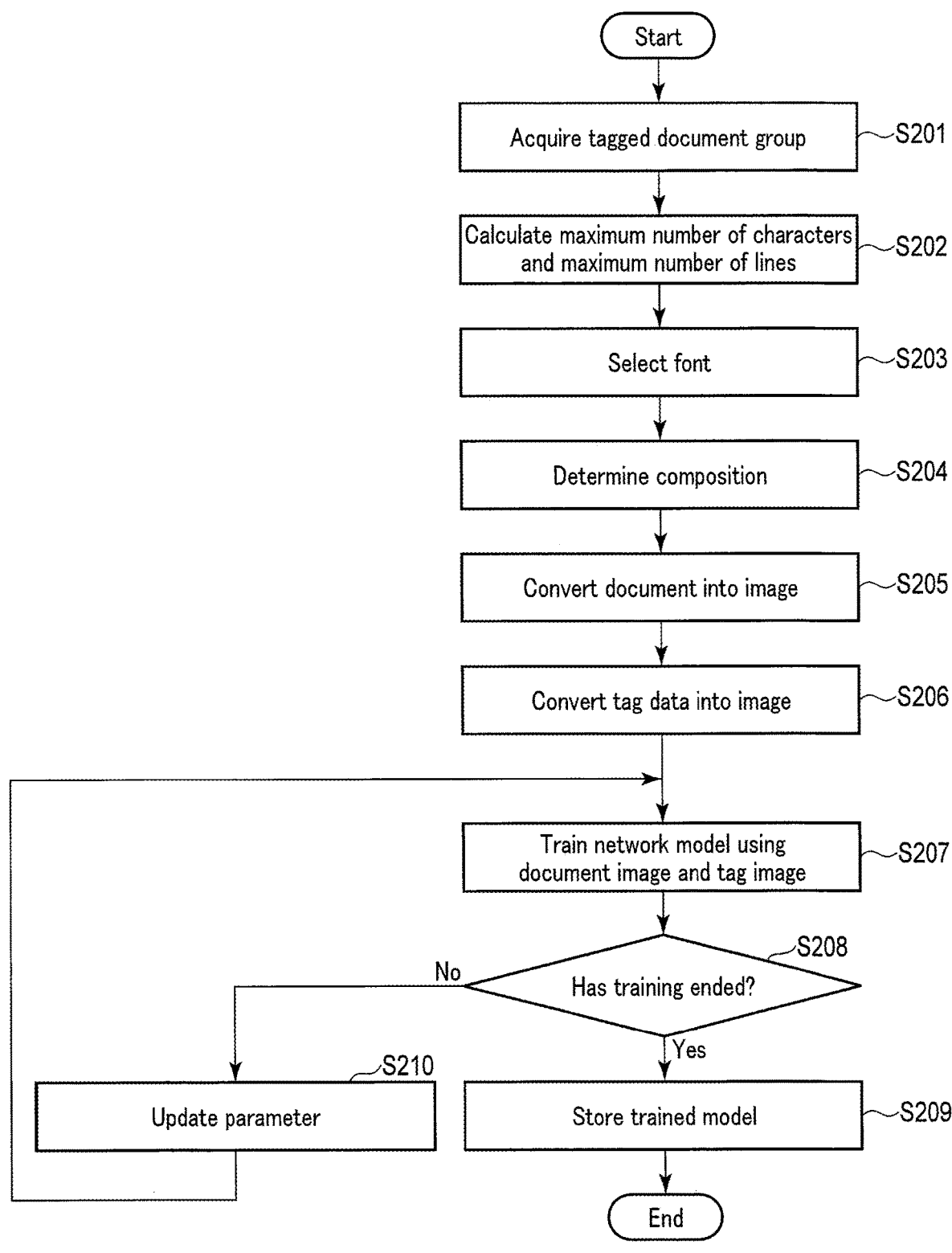
F I G. 2

| On | 9 | o'clock | AM | on | May | 18 | Taro | ... |
|---|---|---|---|---|---|---|---|---|
| O | B-TIM | I-TIM | I-TIM | O | B-DAT | I-DAT | B-PSN | ... |

FIG. 3

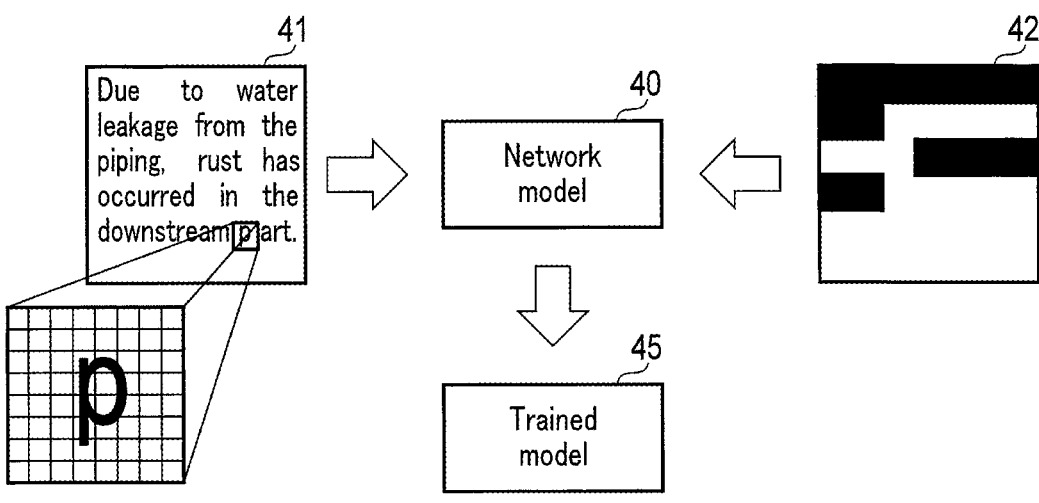
F I G. 4
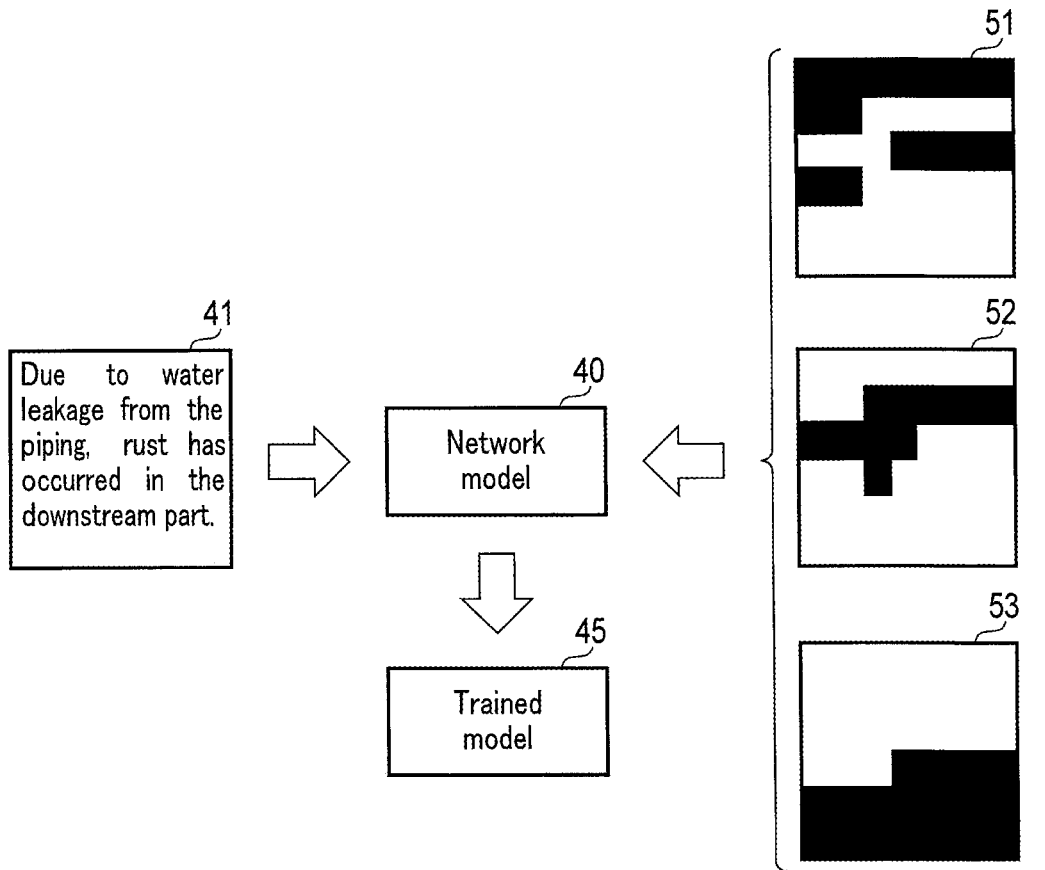
F I G. 5

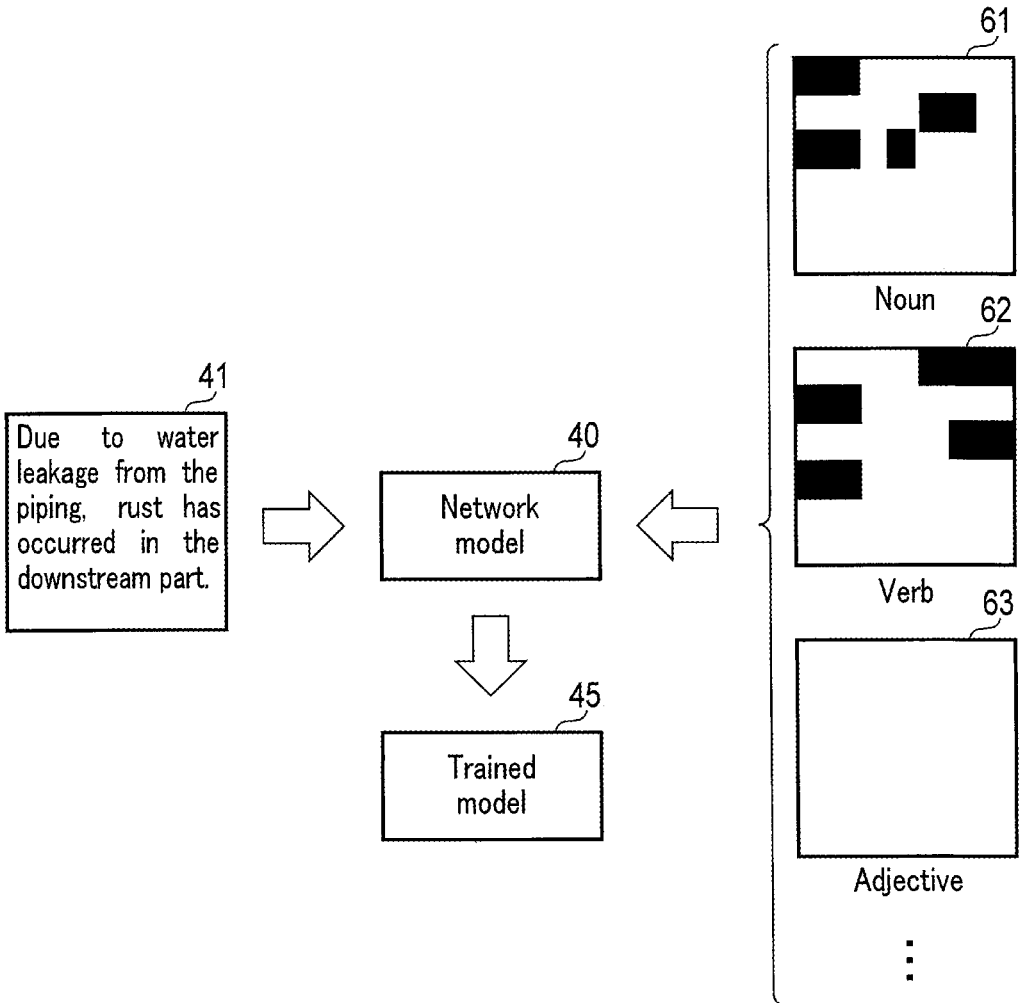
F I G. 6

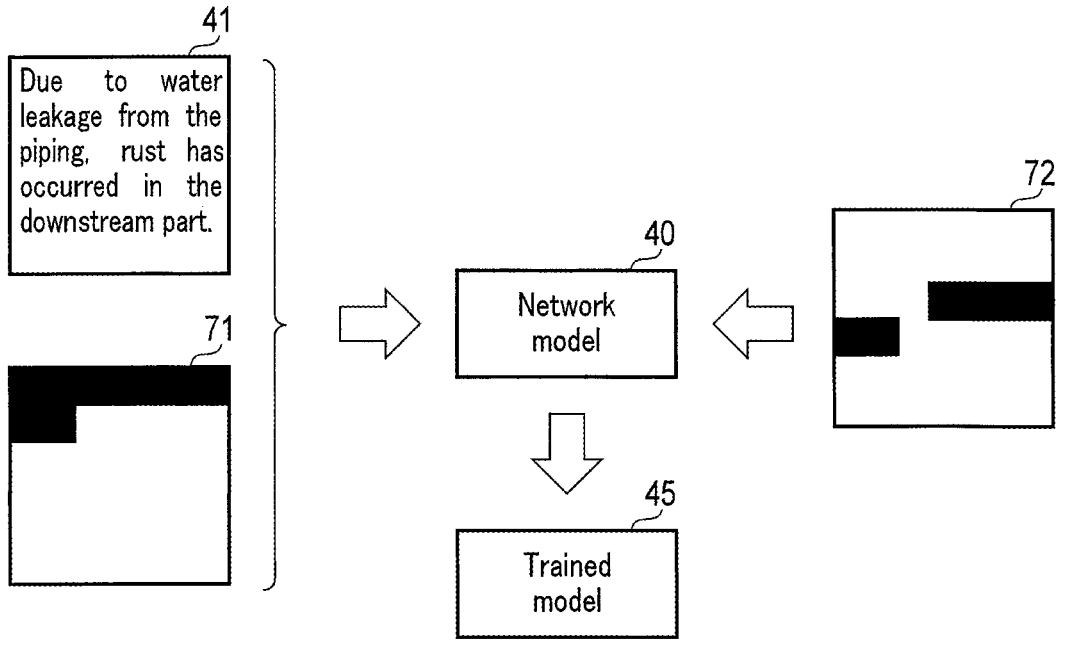
F I G. 7

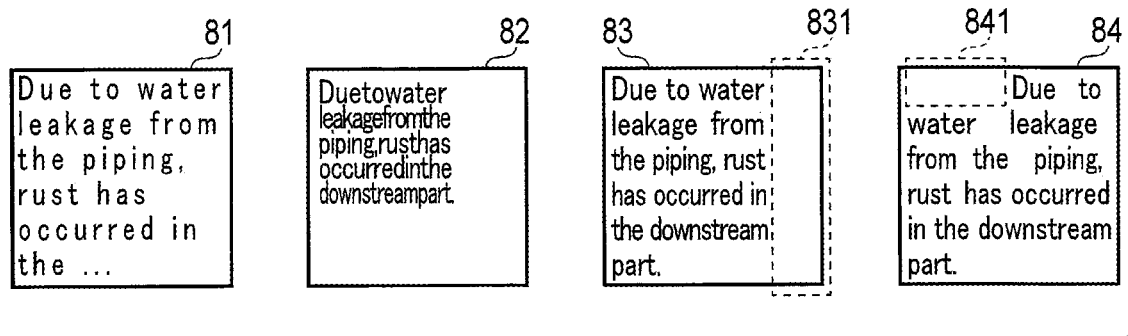
F I G. 8
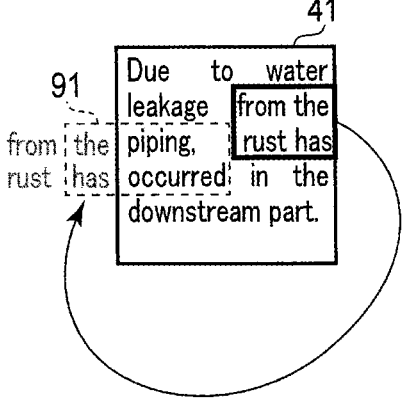
F I G. 9

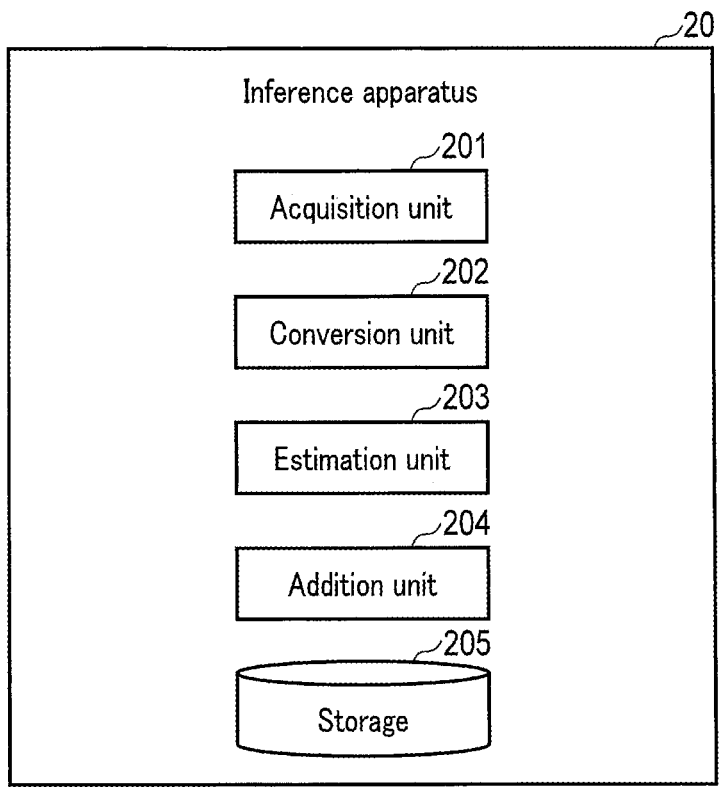
F I G. 10

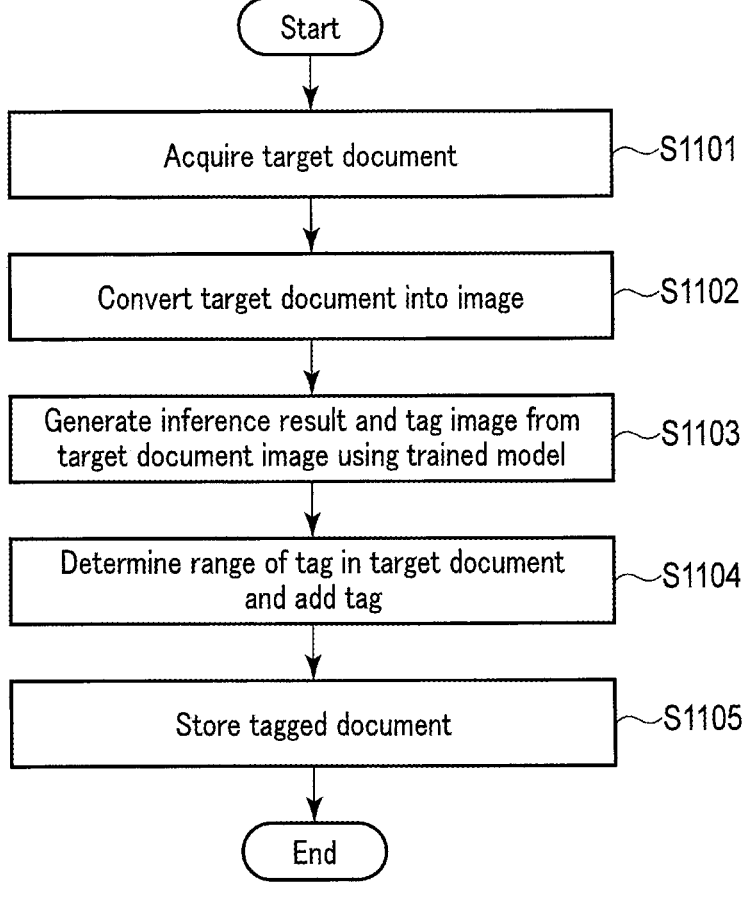
Start
Acquire target document ~S1101
Convert target document into image ~S1102
Generate inference result and tag image from target document image using trained model ~S1103
Determine range of tag in target document and add tag ~S1104
Store tagged document ~S1105
End
F I G. 11

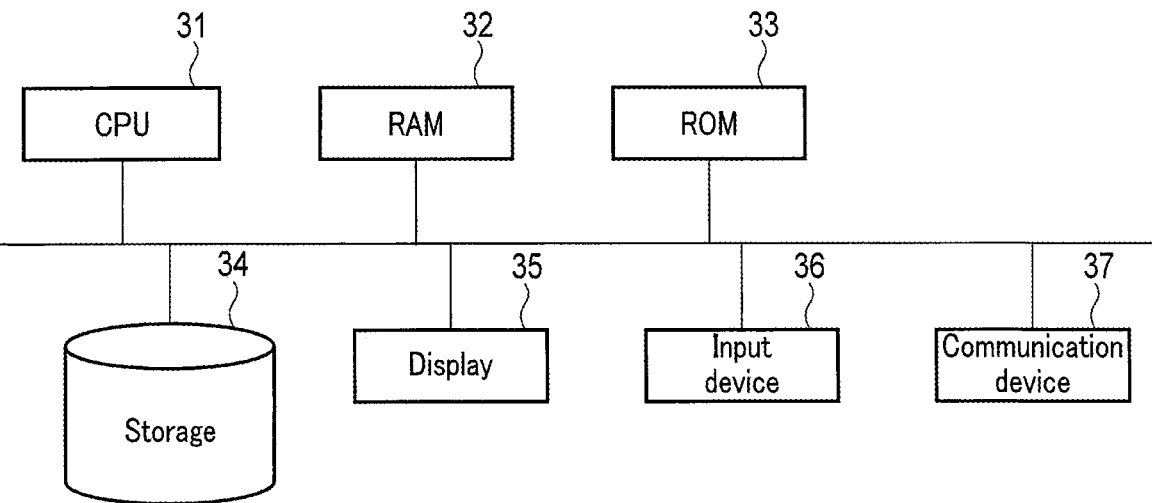
F I G. 12

LEARNING APPARATUS, METHOD AND INFERENCE APPARATUS

CROSS-REFERENCE TO RELATED APPLICATION

This application is based upon and claims the benefit of priority from Japanese Patent Application No. 2022-031923, filed Mar. 2, 2022, the entire contents of which are incorporated herein by reference.

FIELD

Embodiments described herein relate generally to a learning apparatus, a method and an inference apparatus.

BACKGROUND

With the development of deep learning in recent years, even in a case where natural language processing using machine learning is executed in units of character strings instead of words, a certain inference accuracy can be obtained. In machine learning, many studies have been made on image recognition.

In a case where a character is imaged, a sequence of 0 or 1 of pixels expressing the character can be considered as an ID of the character, and the character can be uniquely identified. Therefore, application of machine learning to the imaged character is assumed.

Meanwhile, in machine learning, it is also important to increase the number of training data by data augmentation since preparing a large amount of training data leads to improvement in accuracy. However, unlike a general image, since text needs to handle discrete values of characters or words, there is a problem that data cannot be augmented by rotation, inversion, and the like of a simple image such as a general image, and it is difficult to prepare a large amount of training data.

BRIEF DESCRIPTION OF THE DRAWINGS

FIG. 1 is a block diagram illustrating a learning apparatus according to a first embodiment.

FIG. 2 is a flowchart illustrating an operation example of the learning apparatus according to the first embodiment.

FIG. 3 is a diagram illustrating an example of tag data according to the present embodiment.

FIG. 4 is a diagram illustrating a first example of a document image and a tag image.

FIG. 5 is a diagram illustrating a second example of a document image and a tag image.

FIG. 6 is a diagram illustrating a third example of a document image and a tag image.

FIG. 7 is a diagram illustrating a fourth example of a document image and a tag image.

FIG. 8 is a diagram illustrating an example of data augmentation of a document image.

FIG. 9 is a view illustrating a padding example in a convolution processing.

FIG. 10 is a block diagram illustrating an inference apparatus according to a second embodiment.

FIG. 11 is a flowchart illustrating an operation example of the inference apparatus according to the second embodiment.

FIG. 12 is a diagram illustrating an example of a hardware configuration of the learning apparatus and the inference apparatus according to the present embodiment.

DETAILED DESCRIPTION

In general, according to one embodiment, a learning apparatus includes a processor. The processor acquires a document to which a tag is added. The processor converts the document into an image to generate a document image, and converts the tag into an image according to composition of the document image to generate a tag image. The processor trains a network model using the document image as input data and the tag image as ground truth data to generate a trained model.

Hereinafter, a learning apparatus, a method, a program, and an inference apparatus according to the present embodiment will be described in detail with reference to the drawings. Note that, in the following embodiment, portions denoted by the same reference numerals perform the same operation, and redundant description will be appropriately omitted.

First Embodiment

A learning apparatus according to a first embodiment will be described with reference to the block diagram of FIG. 1.

The learning apparatus 10 according to the first embodiment includes an acquisition unit 101, a calculation unit 102, a selection unit 103, a determination unit 104, a conversion unit 105, a training unit 106, and a storage 107.

The acquisition unit 101 acquires a plurality of tagged documents that are documents to which a tag is added. The document is assumed to be text data including one or more character lines. The tag is metadata indicating, for example, a range of words constituting a unique expression, a type of a part of speech, a causal relationship, and the like with respect to the document. Note that any label determined in another sequence labeling problem can be similarly applied as a tag. Hereinafter, the plurality of tagged documents is also referred to as a tagged document group.

The calculation unit 102 calculates the maximum number of characters and the maximum number of lines in the tagged document included in the tagged document group.

The selection unit 103 selects a font of the document.

The determination unit 104 determines composition within a range of the maximum number of characters and the maximum number of lines for each document.

The conversion unit 105 converts the document into an image to generate a document image. The conversion unit 105 converts a tag into an image according to composition of the document image to generate a tag image.

The training unit 106 trains the network model using the document image as input data and the tag image as ground truth data, and generates a trained model.

The storage 107 stores a tagged document, a trained model, and the like.

Next, an operation example of the learning apparatus 10 according to the first embodiment will be described with reference to the flowchart of FIG. 2.

In step S201, the acquisition unit 101 acquires a tagged document group including a plurality of tagged documents.

In step S202, the calculation unit 102 calculates a maximum number of characters NX and a maximum number of lines NY of one line of the document from the tagged document group. Note that the calculation unit 102 may determine the maximum number of characters NX and the maximum number of lines NY in advance.

In step S203, the selection unit 103 selects the font of the document. In the present embodiment, it is assumed that the character size is a fixed equal width font, but a proportional font may be used.

In step S204, the determination unit 104 determines composition of the document. For example, in a case where the width of one character of the font selected in step S203 is FX [dot] and the height is FY [dot], the width of the document image can be defined as "NX×FX", and the height of the document image can be defined as "NY×FY".

In step S205, the conversion unit 105 converts the composed document into an image to generate a document image. In a simple manner, a brightness distribution displayed when a text file is opened by a word processing software such as WORD® may be used as an image, or in the case of processing by itself, the font image may be arranged one by one on a plain image according to which line and which character each character in the text corresponds.

In step S206, the conversion unit 105 converts the tag data added to the tagged document into an image to generate a tag image. Specifically, the conversion unit 105 generates tag images of the number of channels according to the number of types of tags. The tag image corresponds to the same composition as the document image, and the size of the tag image is the same size as the document image. The conversion unit 105 generates image data in which an area on the tag image corresponding to the character size area of the character string to which a tag is added in the document image is "on".

For example, "on" indicates that "0" or "255" is set for brightness, that is, black or white is set, and the probability is set to "1.0" for a neural network. In other words, the tag image is mask data in which corresponding portions are filled according to the type of tag such as a proper noun.

In step S207, the training unit 106 trains the network model using the document image as input data and the tag image as ground truth data. In the present embodiment, in order to assume semantic segmentation processing, a neural network structure such as SegNet, U-Net, PSPNet, or RefineNet including a convolutional neural network (CNN) including a convolutional layer may be used as a network model. Note that the network model is not limited to the above-described neural network structure, and any network model may be used as long as it is a network model used in semantic segmentation processing.

In step S208, the training unit 106 determines whether or not the training of the network model has ended. The determination as to whether or not the training has ended may be made, for example, by determining that the training has ended in a case where the loss value of the loss function of the network model is equal to or less than the threshold value. Alternatively, it may be determined that the training has ended in a case where the decrease width of the loss value converges. Furthermore, it may be determined that the training has ended in a case where the training of a predetermined number of epochs is finished. In a case where the training has ended, a trained model is generated, and the processing proceeds to step S209. On the other hand, in a case where the training has not ended, the processing proceeds to step S210.

In step S209, the storage 107 stores the generated trained model.

In step S210, the training unit 106 updates the parameters (weight coefficient, bias, etc.) of the network model in a manner that the loss value of the loss function becomes the minimum, and returns to step S207 to repeat the same processing.

Next, an example of tag data according to the present embodiment will be described with reference to FIG. 3.

FIG. 3 illustrates an example in which a tag is added to a range of words constituting a unique expression for a document.

The upper part of FIG. 3 illustrates a character string of the document, and the lower part of FIG. 3 illustrates a tag added to the upper character string for each word. Here, examples of the tag of a unique expression include a person's name (PSN), a date (DAT), and a time (TIM). "B-" is added to a first word constituting a unique expression, "I-" is added to the subsequent word, and "O" is added to a word that is not a unique expression.

Specifically, since "Taro" is a person's name, a tag of "B-PSN" is added. In addition, since "May 18" is a date, "B-DAT" is added to "May", and "I-DAT" is added to the subsequent "18". On the other hand, since "on" which is a postpositional particle is not a unique expression, "O" is added.

Next, a first example of the document image and the tag image will be described with reference to FIG. 4.

In FIG. 4, a tagged document to which a causal relationship tag is added is assumed for a document "Due to water leakage from the piping, rust has occurred in the downstream part." Here, a case where "water leakage from the piping" and "rust has occurred" are associated is assumed as a causal relationship tag.

The input data to a network model 40 is a document image 41 obtained by converting a document "Due to water leakage from the piping, rust has occurred in the downstream part." into an image. The ground truth data for the network model 40 is a tag image 42 in which the brightness value of the area of the character size in the character string corresponding to the causal relationship tag, that is, the character string of "water leakage from the piping" and "rust has occurred" is set to 0 (here, black), and the brightness value of the other area is expressed at the maximum (here, white). Note that, in the following description, setting a certain area as the brightness value zero in the tag image is also referred to as "masking".

By training using the document image 41 and the tag image 42, the network model 40 executes semantic segmentation processing on the document image 41, and learns whether or not each pixel of the document image 41 is an area to which a tag is added. That is, in a case where the semantic segmentation processing is executed on the character size area of one character, segmentation is performed along the shape of the character (or character string). Therefore, it is possible to learn what kind of tag is added to the shape of the character string without interpreting the meaning of the character by the network model 40.

Next, a second example of the document image and the tag image will be described with reference to FIG. 5.

In FIG. 5, as ground truth data for the document image 41, a tag image 51 in which an area to which a causal relationship tag is added is masked, a tag image 52 in which an area to which a causal tag is not added in an area in which a character string of the document image is present is masked, and a tag image 53 in which an area in which no text is present in the document image 41 is masked are prepared.

In this manner, by learning the network model 40 using the three types of tag images 51 to 53 as ground truth data, more robust inference performance can be obtained.

Next, a third example of the document image and the tag image will be described with reference to FIG. 6.

FIG. 6 illustrates an example of generating a tag image according to the type of tag as ground truth data for the document image 41. Here, a tag image according to the type of a part of speech is assumed. Specifically, a tag image 61 in which a noun present in the document included in the document image 41 is masked, a tag image 62 in which a verb is masked, and a tag image 63 in which an adjective is masked are prepared. Note that, here, since no adjective is present in the document of the document image 41, the tag image has no mask area. Note that, for example, in a recurrent neural network (RNN), padding and masking are often used to balance the number of characters for each sentence. Therefore, also in the present embodiment, in order to explicitly handle an area padded to balance the number of characters of the document, the conversion unit 105 may generate a tag image indicating a channel for padding, that is, a padded area, and the training unit 106 may use the tag image as ground truth data.

In this manner, by generating ground truth data for each of a plurality of different tags and causing the tags to learn, it is possible to obtain an inference result for each type of tag at the time of inference.

Next, a fourth example of the document image and the tag image will be described with reference to FIG. 7.

FIG. 7 is an example of training data assuming a causal relationship extraction task, for example, and in addition to the document image 41, a tag image 71 indicating the range of cause events as target data is input to the network model 40 as input data. On the other hand, a tag image 72 indicating the range of the outcome event is input to the network model 40 as ground truth data.

As a result, a trained model 45 capable of estimating a causal relationship can be generated.

Next, an example of data augmentation of the document image will be described with reference to FIG. 8.

As an example of the data augmentation of the document image, the determination unit 104 may determine a plurality of compositions in which at least one of different character intervals and different line intervals is set. FIG. 8 illustrates a document image 81 in which the interval between the characters is increased as compared with the document image 41 having the character interval of the predetermined interval. That is, the center distance between the characters does not need to be the same as the size of the font, and the characters are arranged with a certain margin M. That is, the determination unit 104 defines the width of the document image as "NX×(FX+M)" and the height of the document image as "NY×(FY+M)", and the conversion unit 105 converts the document into an image, generating the document image 81.

On the other hand, the characters may overlap each other, and the determination unit 104 generates a document image 82 by defining the width of the document image as "NX× (FX−M)" and the height of the document image as "NY× (FY−M)".

In addition, the determination unit 104 may determine a plurality of compositions in which different blank spaces are set. The number of characters in one line in the document image is not limited to NX [characters], and composition is determined in a manner that the character string is folded back with NX' [characters], which is the number of characters smaller than NX. Thus, the conversion unit 105 generates a document image 83. In the document image 83, there are many blank spaces 831 on the right side. However, in a case where the number of lines is larger than the maximum number of lines NY when the character string is folded back with NX' [characters], the character string exceeding the maximum number of lines NY may be deleted.

In addition, the determination unit 104 is not limited to setting the head of the character string to the left end, and the composition may be performed by arranging the beginning of the character string at any position such as from the center of the area to be the document image. A document image 84 is generated by arranging the head of the line near the center of the line. The document image 84 has a blank space 841 at the start position.

Furthermore, the determination unit 104 may determine a plurality of compositions in which the character arrangement is changed according to a predetermined law or randomly in a row while maintaining the character pronunciation direction of the character string in the area of the document image. For example, in a case where there is a document "It will be sunny tomorrow", characters may be randomly arranged within an allowable range in which character pronunciation of a character string can be performed forward, such as arranging "It" at a lower position in a line and arranging "will" at an upper right position in the line.

In addition, the determination unit 104 may determine a plurality of compositions displayed in different fonts or different character sizes. For example, a composition in which a character string is displayed in the Times New Roman typeface and a composition in which a character string is displayed in the Arial typeface may be determined, and each document image may be generated. Of course, a plurality of different compositions may be determined by appropriately combining the above-described variation methods of composition.

In this manner, the determination unit 104 prepares variations of character string composition from one document and generates a plurality of different document images, in a manner that data augmentation of the document can be easily executed.

Note that, as illustrated in FIG. 8 and the like, in a case where a document image is generated by a variation of composition, as a corresponding tag image, a tag image (first tag image) corresponding to a position of a character string corresponding to each of a plurality of different compositions may be generated, or a tag image (second tag image) corresponding to a position of a character string in a case where characters are uniformly arranged (monospaced arrange) may be generated by default setting, for example, as in the document image 41 of FIG. 4. For example, the conversion unit 105 may select ground truth data according to a user instruction on whether to set the first tag image as the ground truth data or the second tag image as the ground truth data.

Next, a padding example in the convolution processing in the network model will be described with reference to FIG. 9.

FIG. 9 illustrates an example in which a convolution filter 91 (kernel) of the convolution layer is set for the end portion of the document image 41 input to the network model. Here, a case where the filter 91 has a size of 2×2 characters is assumed.

In the convolution for a general image, the peripheral area outside the image is 0 padded with respect to the pixel position of the end portion, but in the end portion of the document image 41 according to the present embodiment, padding is performed with the character strings before and after the foldback of the character string to be processed in consideration of the document connection. In the example of FIG. 9, in a case where the filter 91 is set in the area related to "piping," and "occurred" in the character string "from the piping, rust has occurred in the downstream part", "the" that is the character string immediately before "piping" is folded and "has" that is the character string immediately before "occurred" is folded are padded, and the convolution processing is executed by the filter 91.

As a result, instead of causing the meaning of the character string to be recognized verbally, it is possible to perform convolution processing to extract features of character string connections on an image basis.

According to the first embodiment described above, a document image obtained by converting a document into an image and a tag image related to tag information added to the document are generated, and a network model is trained using the document image and the tag image to generate a trained model. This allows natural language processing tasks such as causal relationship extraction for documents to be inferred on an image basis. In addition, by recognizing a document with an image, Chinese characters having the same radical often have similar meanings, and thus the meaning of Chinese characters can be learned from such commonality of the radicals. Furthermore, in a case where natural language processing is performed on a document as it is, it is difficult to recognize indentation information and layout information such as itemized items. However, by converting the document into an image and training the network as two-dimensional arrangement, it is possible to learn layout information including itemized items.

Furthermore, by changing composition of the document and converting the composition into an image, data augmentation of the document can be easily executed. For example, when the width of composition is changed by changing the arrangement such as changing the type or size of the font or shifting the character position, the line feed is changed, in a manner that different variations can be generated as the document image even in the same document. Therefore, a large number of training data can be prepared, and as a result, the inference accuracy of the model can be improved.

Second Embodiment

In a second embodiment, an inference apparatus that executes inference processing using the trained model trained in the first embodiment will be described.

An inference apparatus according to a second embodiment will be described with reference to the block diagram of FIG. 10.

An inference apparatus 20 includes an acquisition unit 201, a conversion unit 202, an estimation unit 203, an addition unit 204, and a storage 205.

The acquisition unit 201 acquires a target document as a processing target.

The conversion unit 202 converts the target document into an image and generates a target document image.

The estimation unit 203 inputs the target document image to the trained model trained in the first embodiment and obtains an inference result. In addition, the tag image related to the target document image is estimated from the inference result.

The addition unit 204 adds the tag information to the target document based on the corresponding positional relationship between the target document image and the tag image.

The storage 205 stores the target document to which the tag information is added.

Next, an operation example of the inference apparatus 20 according to the second embodiment will be described with reference to the flowchart of FIG. 11.

In step S1101, the acquisition unit 201 acquires the target document.

In step S1102, the conversion unit 202 converts the target document into an image and generates a target document image. The conversion unit 202 generates the target document image by setting the document image in the learning phase based on the maximum number of characters NX, the maximum number of lines NY, and the font size FX×FY of the line of the document set in the learning phase according to the first embodiment. For example, in a case where the setting of the margin, the number of characters for folding back the character string, and the like are executed in the learning phase, the target document image may be generated with the setting similar to the setting.

In step S1103, the estimation unit 203 inputs the target document image to the trained model and generates an inference result. The inference result is obtained as a probability indicating which tag corresponds to the value for each channel of each dot of the target document image. In general, since the gradation of the brightness value is present also in the pixel area corresponding to the character portion of the target document image, which tag the character expressed in the target document image belongs to may be determined by determining that the character in the pixel area belongs to the tag having the largest average of the probability values of the tags added to all the dots in the pixel area of the character. Alternatively, the tag estimated for each dot in the pixel area of the character may be counted, and it may be determined that the character in the pixel area belongs to the tag having the mode value.

Note that, since there is a possibility that the tag is switched for each character depending on a character shape and the like, a tag having an average value or a mode value in a range of several characters up, down, left, and right of the target character may be determined as the tag to which the target character belongs.

Based on the inference result described above, the estimation unit 203 generates a tag image. For example, in the case of tagging related to causal relationship extraction, the estimation unit 203 may perform image processing in a manner that the area of the font size of the character string inferred to have a causal relationship is masked. In addition, in the case of tagging related to the classification of a part of speech, the estimation unit 203 may perform image processing in a manner that the area of the font size of the character string has a different brightness value or color for each type of the estimated part of speech. Note that if the network model is trained to output the above-described tag image, the above-described tag image may be output as an inference result of the trained model.

In step S1104, the addition unit 204 determines the range of the tag in the document based on the corresponding positional relationship between the target document image and the tag image, and adds the tag to the target document. For example, since the target document image and the tag image have the same image size, the area where the target document image and the tag image overlap may be determined as the range of the tag for the target document. As a result, the target document and the tag acquired in step S1101 can be associated with each other.

In step S1105, the storage 205 stores the target document to which a tag is added.

According to the second embodiment described above, it is possible to infer a tag image from a target document with high accuracy by using a trained model that inputs a document and infers a tag image for the document.

Next, an example of a hardware configuration of a learning apparatus 10 according to the above-described embodiment is illustrated in a block diagram of FIG. 12. Note that an example of the learning apparatus 10 will be described below, but the inference apparatus 20 may also have a similar hardware configuration.

The learning apparatus 10 includes a central processing unit (CPU) 31 and a random access memory (RAM) 32, a read only memory (ROM) 33, a storage 34, a display apparatus 35, an input apparatus 36, and a communication apparatus 37, which are connected by a bus.

The CPU 31 is a processor that executes arithmetic processing, control processing, and the like according to a program. The CPU 31 uses a predetermined area of the RAM 32 as a work area, and executes processing of each unit of the learning apparatus 10 described above in cooperation with programs stored in the ROM 33, the storage 34, and the like.

The RAM 32 is a memory such as a synchronous dynamic random access memory (SDRAM). The RAM 32 functions as a work area of the CPU 31. The ROM 33 is a memory that stores programs and various types of information in a non-rewritable manner.

The storage 34 is an apparatus that writes and reads data in and from a magnetic recording medium such as a hard disc drive (HDD), a semiconductor storage medium such as a flash memory, a magnetically recordable storage medium such as an HDD, an optically recordable storage medium, and the like. The storage 34 writes and reads data to and from the recording medium under the control of the CPU 31.

The display apparatus 35 is a display apparatus such as a liquid crystal display (LCD). The display apparatus 35 displays various types of information based on a display signal from the CPU 31.

The input apparatus 36 is an input apparatus such as a mouse and a keyboard. The input apparatus 36 receives information input by operation from the user as an instruction signal, and outputs the instruction signal to the CPU 31.

The communication apparatus 37 communicates with an external apparatus via a network in accordance with control from the CPU 31.

The instruction illustrated in the processing procedure illustrated in the above-described embodiment can be executed based on a program that is software. By storing this program in advance and reading this program, a general-purpose computer system can obtain an effect similar to the effect of the control operation of the learning apparatus and the inference apparatus described above. The instructions described in the above-described embodiments are recorded in a magnetic disk (flexible disk, hard disk, and the like), an optical disk (CD-ROM, CD-R, CD-RW, DVD-ROM, DVD±R, DVD±RW, Blu-ray (registered trademark) Disc, and the like), a semiconductor memory, or a recording medium similar these as a program that can be executed by a computer. The storage format may be any form as long as it is a recording medium readable by a computer or an embedded system. When the computer reads a program from the recording medium and causes the CPU to execute an instruction described in the program based on the program, it is possible to realize an operation similar to the control of the learning apparatus and the inference apparatus of the above-described embodiment. Of course, in a case where the computer acquires or reads the program, the program may be acquired or read through a network.

In addition, an operating system (OS) running on a computer, database management software, middleware (MW) such as a network, and the like based on an instruction of a program installed from a recording medium to the computer or an embedded system may execute a part of each processing for realizing the present embodiment.

Furthermore, the recording medium in the present embodiment is not limited to a medium independent of a computer or an embedded system, and includes a recording medium that downloads and stores or temporarily stores a program transmitted via a LAN, the Internet, and the like.

In addition, the number of recording media is not limited to one, and a case where the processing in the present embodiment is executed from a plurality of media is also included in the recording media in the present embodiment, and the configuration of the media may be any configuration.

Note that the computer or the embedded system in the present embodiment is for executing each processing in the present embodiment based on a program stored in a recording medium, and may have any configuration such as an apparatus including one such as a personal computer or a microcomputer, or a system in which a plurality of apparatus is connected to a network.

In addition, the computer in the present embodiment is not limited to a personal computer, and includes an arithmetic processing apparatus, a microcomputer, and the like included in an information processing apparatus, and collectively refers to a machine and an apparatus capable of realizing a function in the present embodiment by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning apparatus comprising a processor configured to:
   acquire a document in which each specific range of text data is associated with a tag, the document including the text data;
   convert the document into an image to generate a document image, and convert, based on types of the tags and areas of the tags, each of the tags into an image according to composition of the document image to generate tag images; and
   repeatedly train a network model and update parameters of the network model using the document image as input data and the tag images as ground truth data to learn whether or not each pixel of the document image is an area to which a tag is added, to generate a trained model having a more robust inference performance.

2. The apparatus according to claim 1, wherein the processor is further configured to:
   determine a plurality of compositions in which the document is displayed in different fonts; and
   generate a plurality of document images corresponding to the plurality of compositions.

3. The apparatus according to claim 2, wherein
   the processor generates, according to a user instruction, a tag image corresponding to a position of a character string corresponding to the compositions, or a tag image corresponding to a position of a character string in a case where characters are arranged in a monospace.

4. The apparatus according to claim 1, wherein the processor is further configured to:

determine a plurality of compositions in which different blank spaces are set in a case where a character string of the document is arranged; and generate a plurality of document images corresponding to the plurality of compositions.

5. The apparatus according to claim 1, wherein the processor is further configured to:

determine a plurality of compositions in which at least one of a different character interval and a different line interval is set in a case where a character string of the document is arranged; and generate a plurality of document images corresponding to the plurality of compositions.

6. The apparatus according to claim 1, wherein the processor is further configured to:

determine a plurality of compositions in which character arrangements are made different according to a predetermined pattern or at random in a line in a case where a character string of the document is arranged; and generate a plurality of document images corresponding to the plurality of compositions.

7. The apparatus according to claim 1, wherein the network model includes a convolution layer that executes convolution processing, and the processor performs padding with one or more characters before or after a character string located at an end portion is folded in a case where the convolution processing is executed on the end portion of the document image.

8. The apparatus according to claim 1, wherein the tag corresponds with at least one of a content of the document and/or a content of a character string in the document.

9. The apparatus according to claim 1, wherein the processor generates, as the ground truth data, the tag images for a plurality of different tags, respectively.

10. A learning method comprising:

acquiring a document in which each specific range of text data is associated with a tag, the document including the text data;

converting the document into an image to generate a document image;

converting, based on types of the tags and areas of the tags, each of the tags into an image according to composition of the document image to generate tag images; and repeatedly training a network model and updating parameters of the network model using the document image as input data and the tag images as ground truth data to learn whether or not each pixel of the document image is an area to which a tag is added, to generate a trained model having a more robust inference performance.

11. The method according to claim 10, further comprising:

determining a plurality of compositions in which the document is displayed in different fonts; and generating a plurality of document images corresponding to the plurality of compositions.

12. The method according to claim 11, wherein the generating the plurality of document images generates, according to a user instruction, a tag image corresponding to a position of a character string corresponding to the compositions, or a tag image corresponding to a position of a character string in a case where characters are arranged in a monospace.

13. The method according to claim 10, further comprising:

determining a plurality of compositions in which different blank spaces are set in a case where a character string of the document is arranged; and generating a plurality of document images corresponding to the plurality of compositions.

14. The method according to claim 10, further comprising:

determining a plurality of compositions in which at least one of a different character interval and a different line interval is set in a case where a character string of the document is arranged; and generating a plurality of document images corresponding to the plurality of compositions.

15. The method according to claim 10, further comprising:

determining a plurality of compositions in which character arrangements are made different according to a predetermined pattern or at random in a line in a case where a character string of the document is arranged; and generating a plurality of document images corresponding to the plurality of compositions.

16. The method according to claim 10, wherein the network model includes a convolution layer that executes convolution processing, and the method further comprising performing padding with one or more characters before or after a character string located at an end portion is folded in a case where the convolution processing is executed on the end portion of the document image.

\* \* \* \* \*